United States Patent
Ho et al.

(10) Patent No.: US 10,318,217 B1
(45) Date of Patent: Jun. 11, 2019

(54) IMPLEMENTATION METHOD OF VIRTUAL PRINT-OUT SYSTEM

(71) Applicant: iCHEF Co., Ltd., Cayman Islands (KY)

(72) Inventors: Ming-Cheng Ho, Taipei (TW); Yi-Han Chang, Taipei (TW); Pei-Yao Ding, Taipei (TW); Teng-Hao Chang, Taipei (TW); Min-Hsuan Kao, Taipei (TW); Tien-Che Tsai, Pingtung County (TW); Xi-Jie Tan, Taipei (TW)

(73) Assignee: ICHEF CO., LTD., Taipei (TW)

( * ) Notice: Subject to any disclaimer, the term of this patent is extended or adjusted under 35 U.S.C. 154(b) by 0 days.

(21) Appl. No.: 15/895,420

(22) Filed: Feb. 13, 2018

(30) Foreign Application Priority Data

Jan. 11, 2018 (TW) .............................. 107101007 A

(51) Int. Cl.
*H04N 1/04* (2006.01)
*G06F 3/12* (2006.01)
*G06Q 50/12* (2012.01)

(52) U.S. Cl.
CPC .......... *G06F 3/1237* (2013.01); *G06F 3/1203* (2013.01); *G06F 3/1284* (2013.01); *G06Q 50/12* (2013.01)

(58) Field of Classification Search
CPC ...... G06F 3/1237; G06F 3/1284; G06F 3/1203
USPC .......................................................... 358/1.15
See application file for complete search history.

(56) References Cited

U.S. PATENT DOCUMENTS

2010/0107057 A1\* 4/2010 Nakamura .......... G06F 17/2247
715/236

\* cited by examiner

*Primary Examiner* — Houshang Safaipour
(74) *Attorney, Agent, or Firm* — Muncy, Geissler, Olds & Lowe, P.C.

(57) ABSTRACT

An implementation method of a virtual print-out system is provided. The method includes setting the number of printing module step; each of the printing modules being in information linking with each of the print-out devices step; inputting rule information step; triggering to print out document logic step; and changing the pointing of the print-out device step, and wherein the virtual print-out system can be simultaneously connected with a plurality of physical print-out devices at different work stations, and the virtual print-out system has plural pieces of rule information preset therein. In this way, the output content of the work station in trouble can be moved quickly to the other work station for printing. Therefore, new store operation or division of labor mode can be achieved by this rapid change of print-out location.

2 Claims, 12 Drawing Sheets

IMPLEMENTATION METHOD OF VIRTUAL PRINT-OUT SYSTEM

BACKGROUND OF INVENTION

Field of the Invention

The present disclosure relates to an implementation method of a virtual print-out system, wherein the virtual print-out system has plural pieces of rule information preset therein, by which a physical print-out device at corresponding print-out position can be driven to perform printing procedure.

Brief Description of Prior Art

Accompanying with meal-ordering operation by general service staff of restaurant, relevant documents are usually printed out from a print-out device. For example, after service staff has finished a meal ordering, the meal details can be printed out directly in the kitchen, or directly at the order counter.

However, when a kitchen has multiple workstations provided with a plurality of print-out devices, the meal-ordering contents of customer are unable to be dispatched to different work station to be printed out separately in full accordance with the kitchen division of labour. Furthermore, it is also difficult to change the sequence of meal-order contents, appearance format and cutting list mode of the printed document according to environmental change such as different ordering content, takeaway or internal use, different regions of floor, the number of people. Moreover, under the condition that each of multiple workstations is provided with a plurality of print-out devices separately, the failure of one of the workstations may cause trouble of work assignment of the workstations. Accordingly, the entire existing print-out process and the hardware devices connection need to be further improved.

SUMMARY OF INVENTION

In order to achieve the above objects, the virtual print-out system of the present disclosure can be simultaneously connected with a plurality of physical print-out device at multiple work stations, and the virtual print-out system allow users to input rule information through a rule establishing module in advance, the rule information is for setting trigger print condition. If the information inputted by user during meal ordering matches the trigger print condition, the system can drive the corresponding workstation to perform a printing procedure. Moreover, each print-out device of the work stations can form a mutual pointing and print out through information linking so that printing procedure can be performed at different location according to different order contents, and print path of each print-out device can be changed on time according to variation of real status so as to match new store operation or division of labour mode.

DETAILED DESCRIPTION OF PREFERRED EMBODIMENTS

Figure 1:
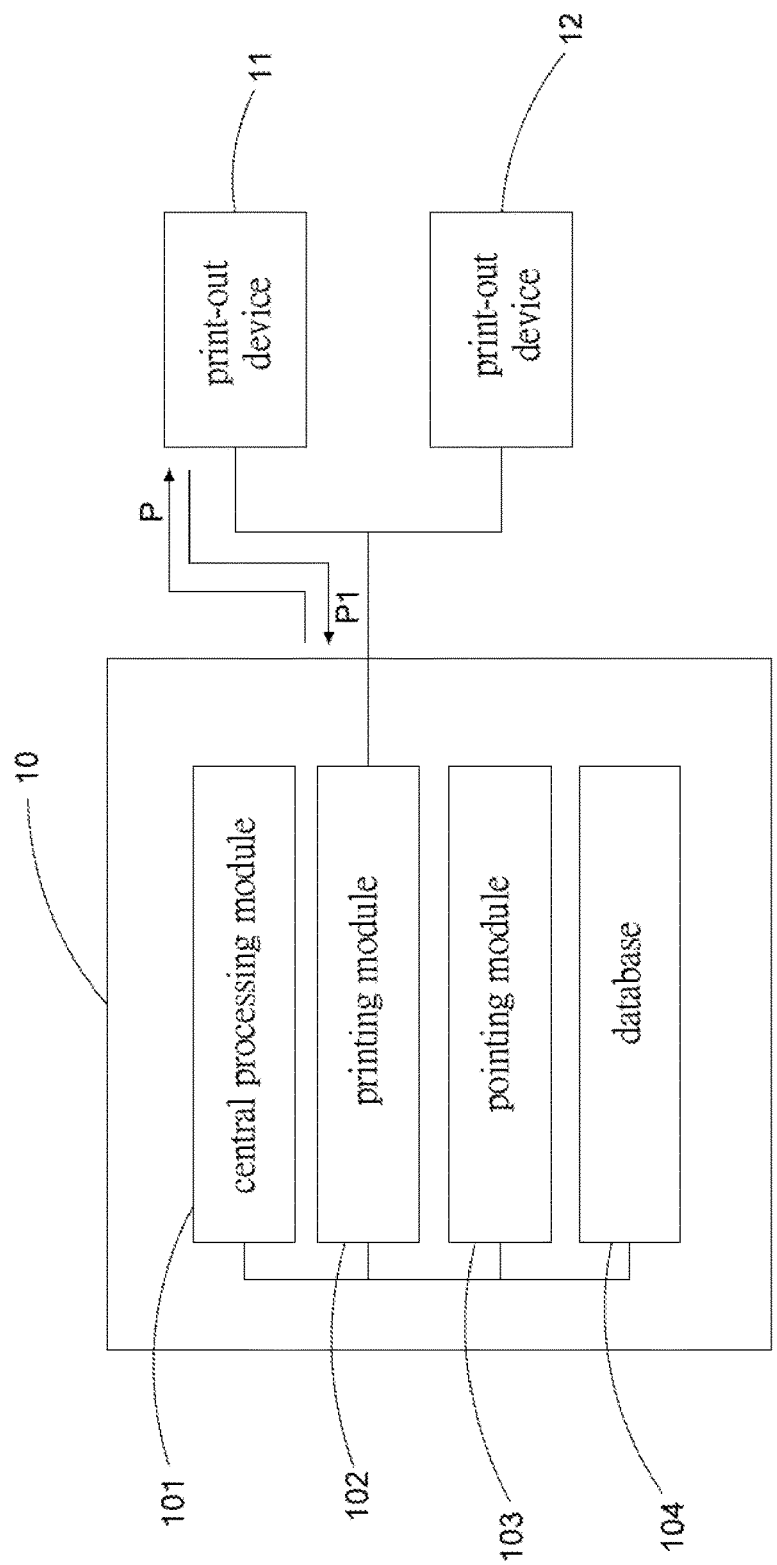
FIG. 1 is a schematic view showing the block diagram of the system of the present disclosure.

Referring to FIG. 1, the virtual print-out system 10 is installed in a server for operation. The virtual print-out system 10 is mainly formed by a central processing module 101, a printing module 102, a pointing module 103 and a database 104. The central processing module 101 can be anyone of a micro-controller, a microprocessor, or a central processing unit (CPU), which is used to execute commands and drive each module to operate, and which is linked respectively with the printing module 102, the pointing module 103, and the database 104. The printing module 102 is connected with more than one print-out devices (11, 12 . . . ) so that user can input more than one piece of rule information in the printing module 102 in advance. The rule information is mainly a print-out logic for allowing trigger condition set by the rule information to be triggered according to meals ordered by customer, when user is inputting the meals through the virtual print-out system 10, so as to perform subsequent print-out procedure. Whether the rule information is a trigger condition or not mainly depends on customization done by a user for a specific occasion, use or object. Therefore, the rule information may be designed to trigger a specific condition under special conditions to meet the occasion or object for which the condition is applicable. For example, the type of the meal may be used as a trigger condition; or it can be triggered according to the area where the customer is located, for example, an interior area, a takeaway area, a delivery area, a reservation area or a waiting area. Furthermore, each area can be further divided into the first floor, the second floor or the third floor according to the floor or division of labour. The customer information can also be used as a trigger condition, such as customer-related information like the number of customers, their ages, membership or not, and membership information. Alternatively, the print-out time, customer ordering time, queuing or customer access time can also be used as the trigger conditions. The pointing module 103 is in information linking with the printing module 102. When the printing module 102 needs to perform a printing operation on one of the print-out devices 11, 12 (for example, a print-out device 11), the printing module 102 will transmit print-out information P to the print-out device 11 which, after receiving the print-out information P, will send status report information P1 to the printing module 102 and perform print-out procedure. When the printing module 102 has not received the status report information P1 over a period of time, it indicates that the print-out device 11 may have trouble, so that the print path may be changed automatically or changed by user through the pointing module 103. For example, the printing originally performed at print-out device 11 is now changed to be performed at print-out device 12. The database 104 is linked to the central processing module 101 and the printing module 102, the database 104 is configured to save the rule information set by the printing module 102.

Figure 2:
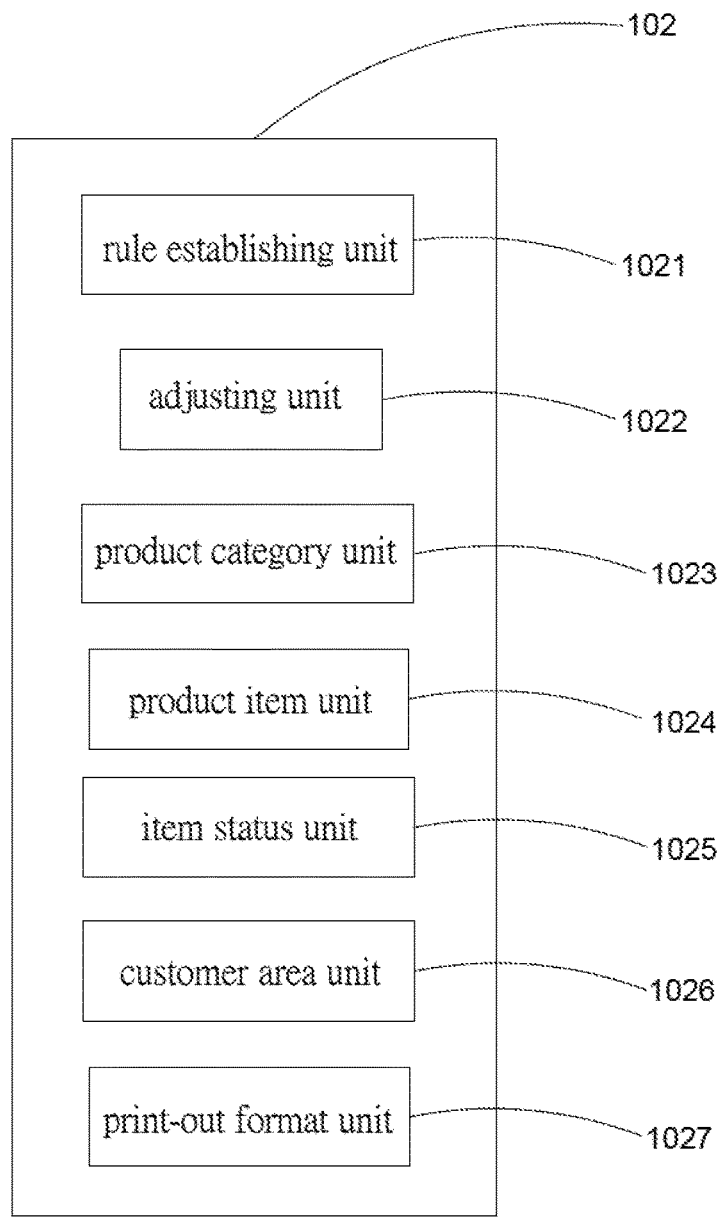
FIG. 2 is a system composition view of the present disclosure.

Referring to FIG. 2 and FIG. 1 as well, the printing module 102 mainly includes a rule establishing unit 1021, an adjusting unit 1022, a product category unit 1023, a product item unit 1024, an item status unit 1025, a customer area unit 1026, and a print-out format unit 1027. The rule establishing unit 1021 is configured to input the rule information for print-out. The rule information is a condition for triggering the print-out logic. For example, the print-out device 11 is installed in the pizza crust work station, while the print-out device 12 is installed in the pizza stuffing work station. If customer orders pizza, user can preset in such a manner that the system drives the print-out device 11 and the print-out device 12 respectively to print out the documents for making pizza crust and pizza stuffing. Therefore, when there is a pizza in the customer's meal order, the condition of triggering the print-out is met so that the system will drive the print-out device 11 and the print-out device 12 to print out the documents for making the pizza. The difference is that the print-out device 11 will print out desired type of pizza crust, while the print-out device 12 will print out desired type of pizza stuffing. By setting different rule information, the location of print-out can be changed quickly so as to meet the operation or division of labour in the store. The adjusting unit 1022 can adjust the sequence of executing plural pieces of rule information by the rule establishing unit 1021.

Figure 3:
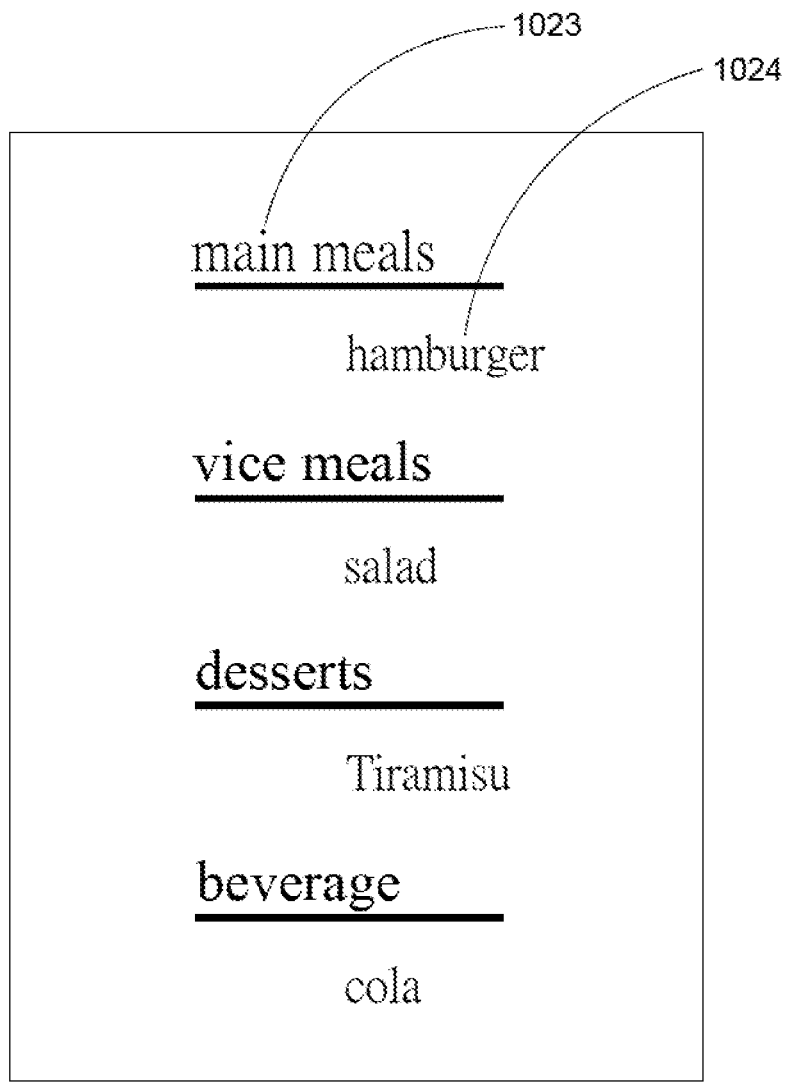
FIG. 3 is a schematic view (I) of the implementation of the present disclosure.

As shown in FIG. 3, the product category unit 1023 is mainly configured to show the types of products on the printed document, such as main meals, vice meals, desserts and beverage types as shown in FIG. 3. The product item unit 1024 can display items of products to show the main meal is burger, the vice meal is wind salad, etc., so that kitchen staff can understand customer's order content more clearly.

Figure 4:
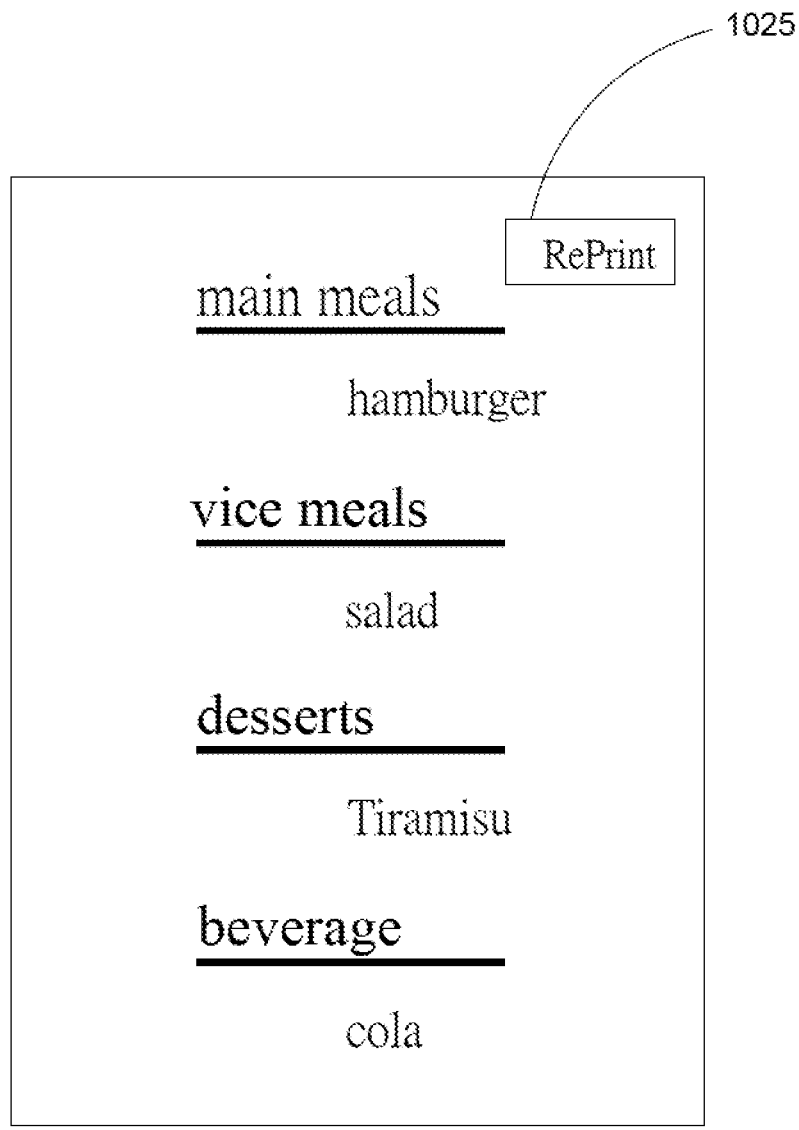
FIG. 4 is a schematic view (II) of the implementation of the present disclosure.
Figure 5:
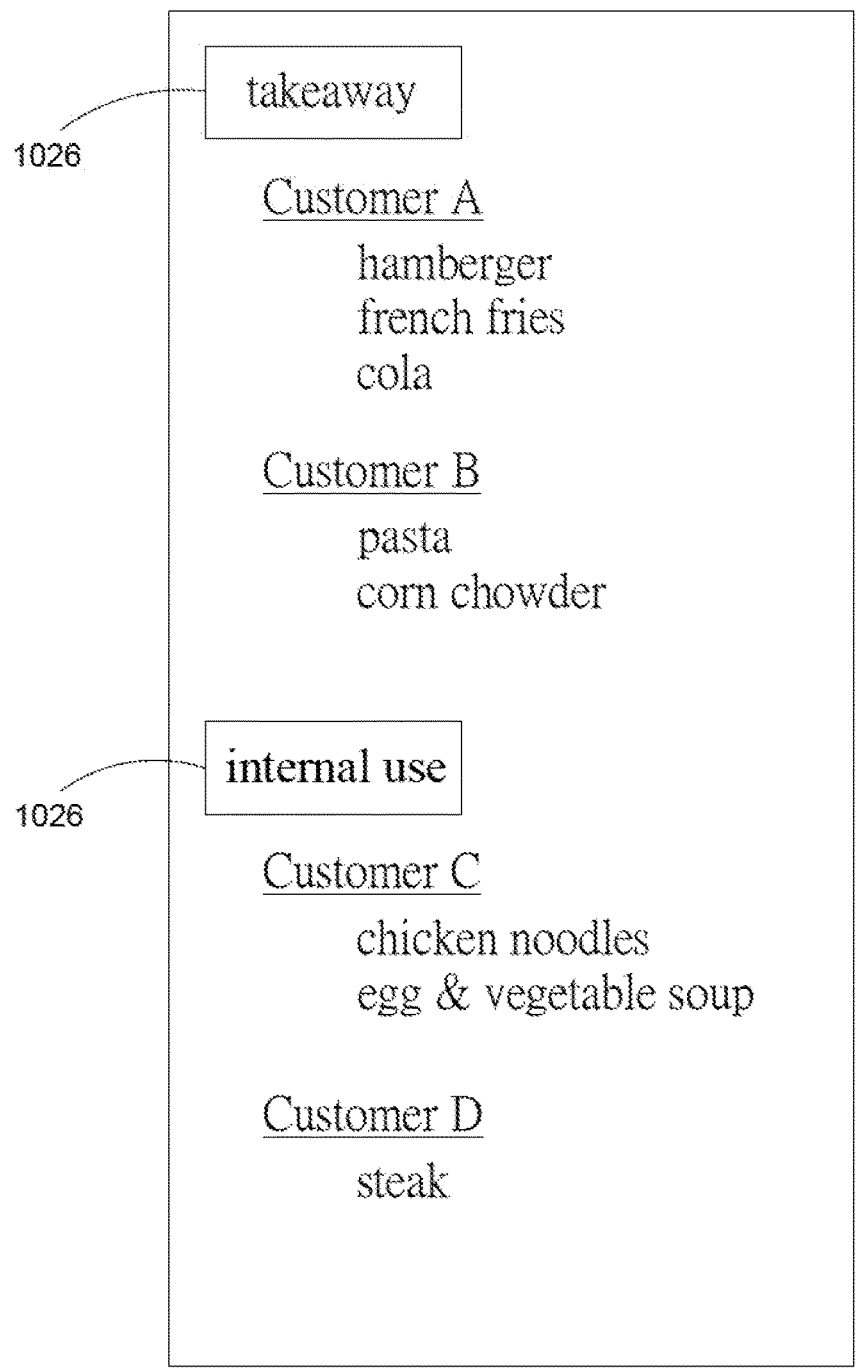
FIG. 5 is a schematic view (III) of the implementation of the present disclosure (1)

As shown in FIG. 4, the item status unit 1025 can show the current status of the order content on the printed document, such as printed out, reprint, erase, shift table, and the like. For example, if reprint is displayed on the print document, it means this meal order content has been printed out, but may be due to slow in serving the meals or process errors etc., it's necessary to notify the staff responsible for preparing meals again so as to avoid staff misunderstanding as additional meals ordered by customer, which may result in repeated meal-preparing problems.

The customer area unit 1026 is configured to store orders of customer's meal-order, and the customer area unit 1026 can display customer's dining attributes on the print list, such as takeaway or internal use. The customer area unit 1026 can also display other different dining attributes, such as display the waiting area and each of the internal floors.

Figure 6:
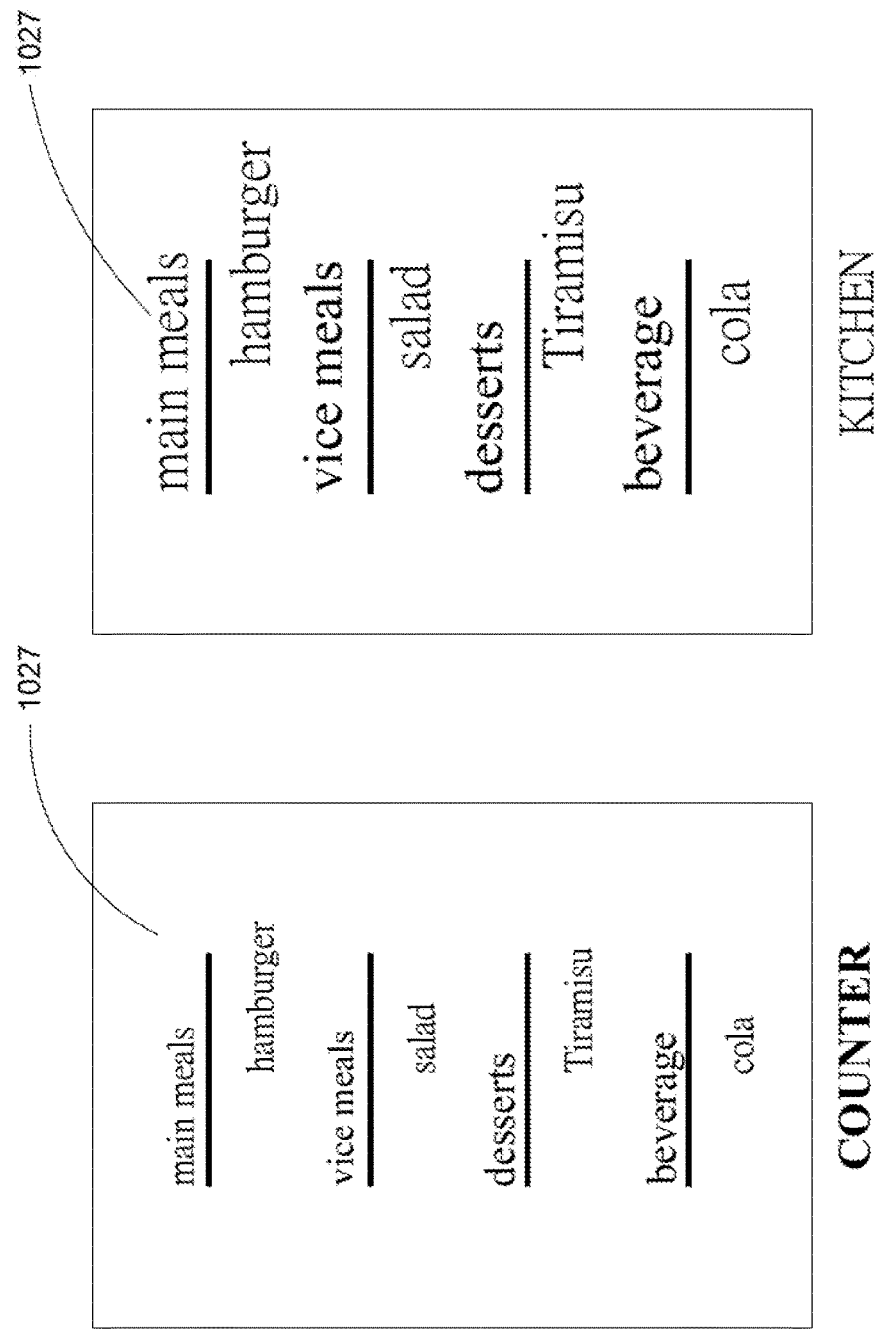
FIG. 6 is a schematic view (IV) of the implementation of the present disclosure (2)

As shown in FIG. 6, the print-out format unit 1027 is configured to display, according to the font and the format of print sheet set by user, different print-out format under different triggering conditions. For example, the print document at the kitchen location has larger display font size so that even a busy kitchen staff can read the print document contents easily; while the display font of the print document at the counter is in ordinary font size.

Figure 7:
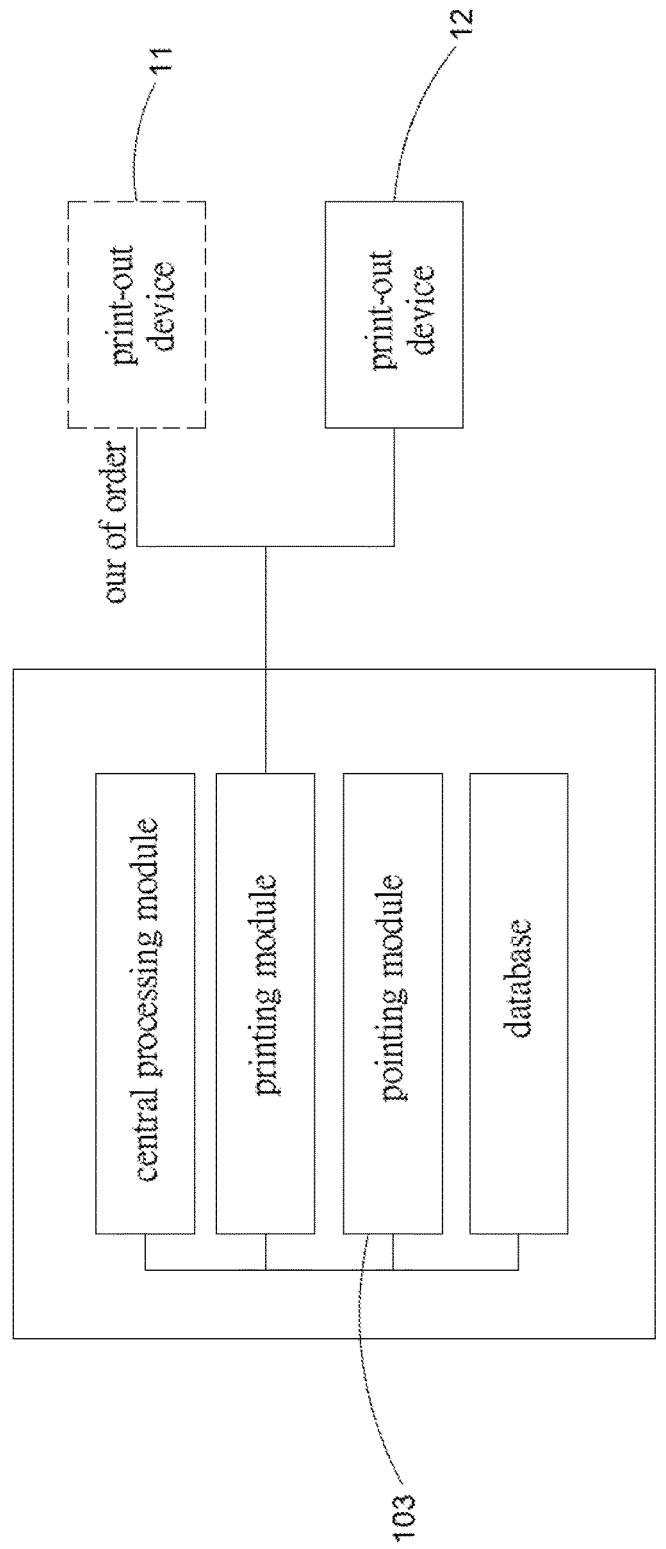
FIG. 7 is a schematic view (V) of the implementation of the present disclosure.

As shown in FIG. 7, when the print-out device (11,12) of a certain work station at site is out of order, the pointing module 103 can be used automatically or by the user so as to rapidly change the printing location of the print-out device (11,12). User only needs to change the printing location of one of the print-out devices (11, 12) connected to the printing module 102 through the pointing module 103. For example, when the print-out device 11 shown in FIG. 7 is out of order, user can change all the print procedures of the printing module 102 on the print-out device 11, and further change to conduct the printing procedure at the print-out device 12. The trigger condition of printing originally at the print-out device 11 is now changed to be at the print-out device 12, that is to say, the printing originally conducted at the print-out device 11 is now shifted to be at the print-out device 12 so as to achieve the purpose of quick response or matching a new work process allocation.

Figure 8:
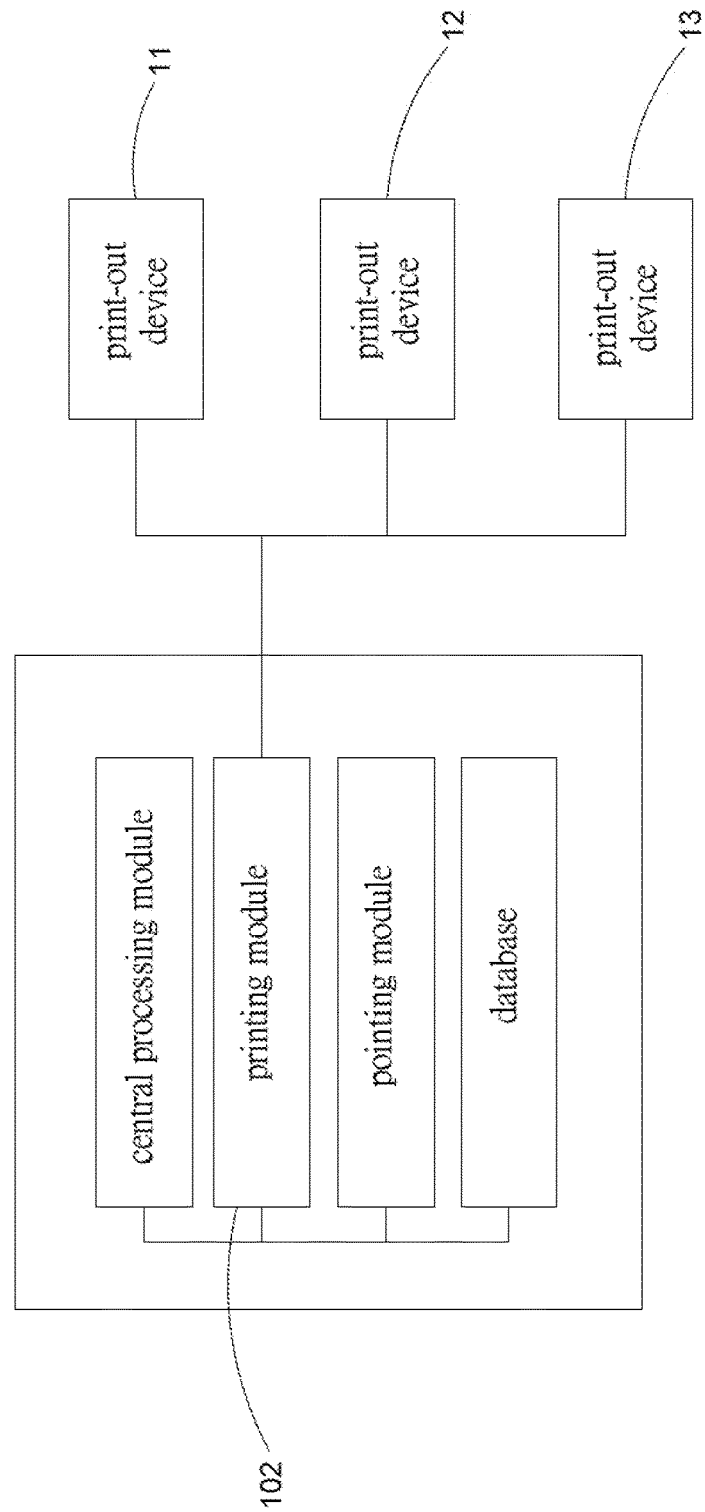
FIG. 8 is a schematic view (VI) of the implementation of the present disclosure (2)

As shown in FIG. 8, the virtual print-out system 10 can simultaneously link with multiple print-out devices through the printing module 102, and the printing module 102 can further in information linking with three print-out devices (11, 12, 13), or even with more print-out devices, but is not limited to this.

Figure 9:
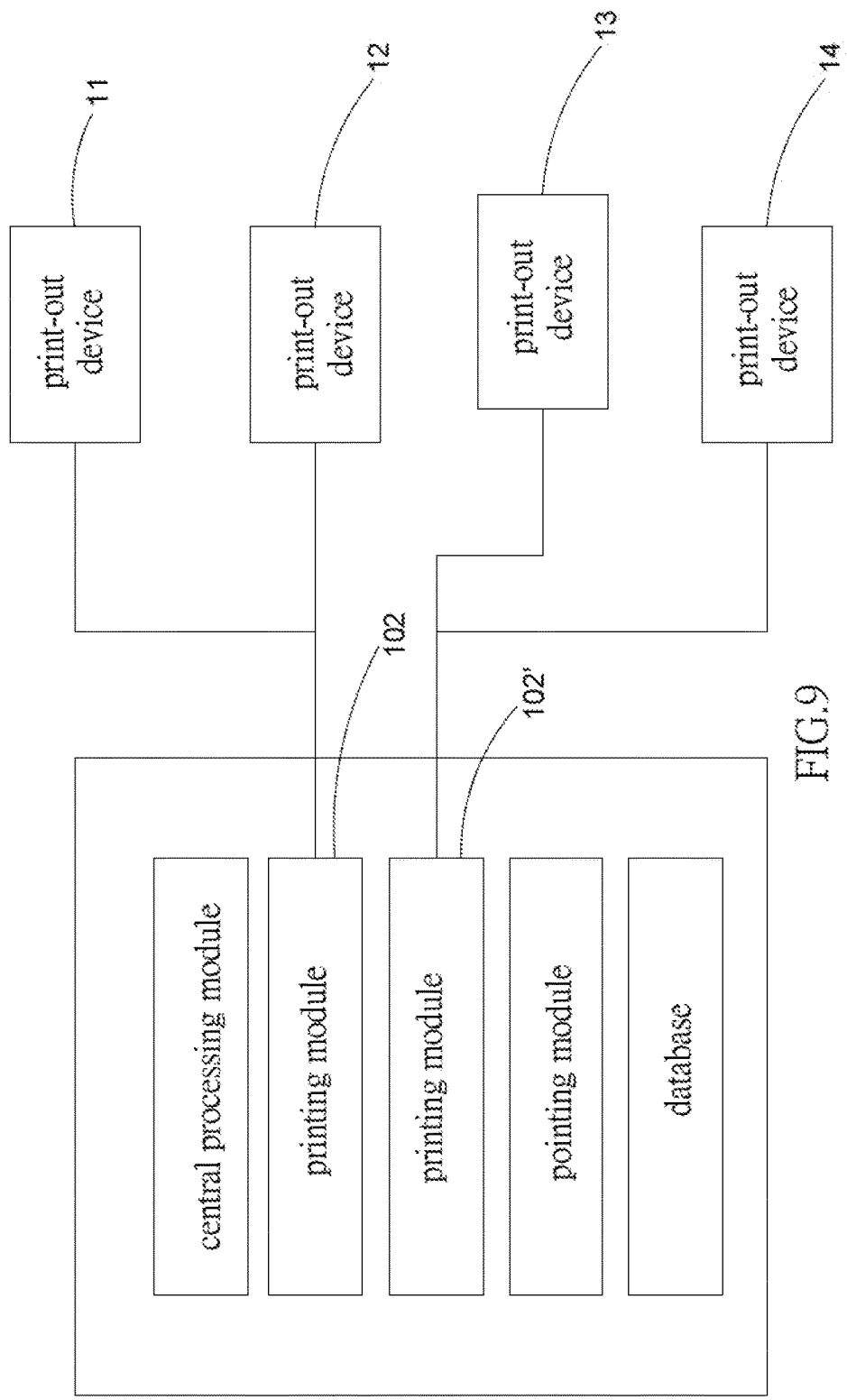
FIG. 9 is another embodiment (1) of the present disclosure.

As shown in FIG. 9, in order to cope with different environmental conditions, the virtual print-out system 10 may further provide with a plurality of printing modules (102, 102') which can respectively link with multiple print-out devices (11, 12, 13, 14), and the printing module (102, 102') can respectively point to a plurality of physical print-out devices. Different printing module (102, 102') can also point to the same print-out device, for example, the printing module (102, 102') can be in information linking with the print-out device 11 simultaneously. However, the above is only an example and is not intended to limit the number of the printing module 102 of the present disclosure.

Figure 10:
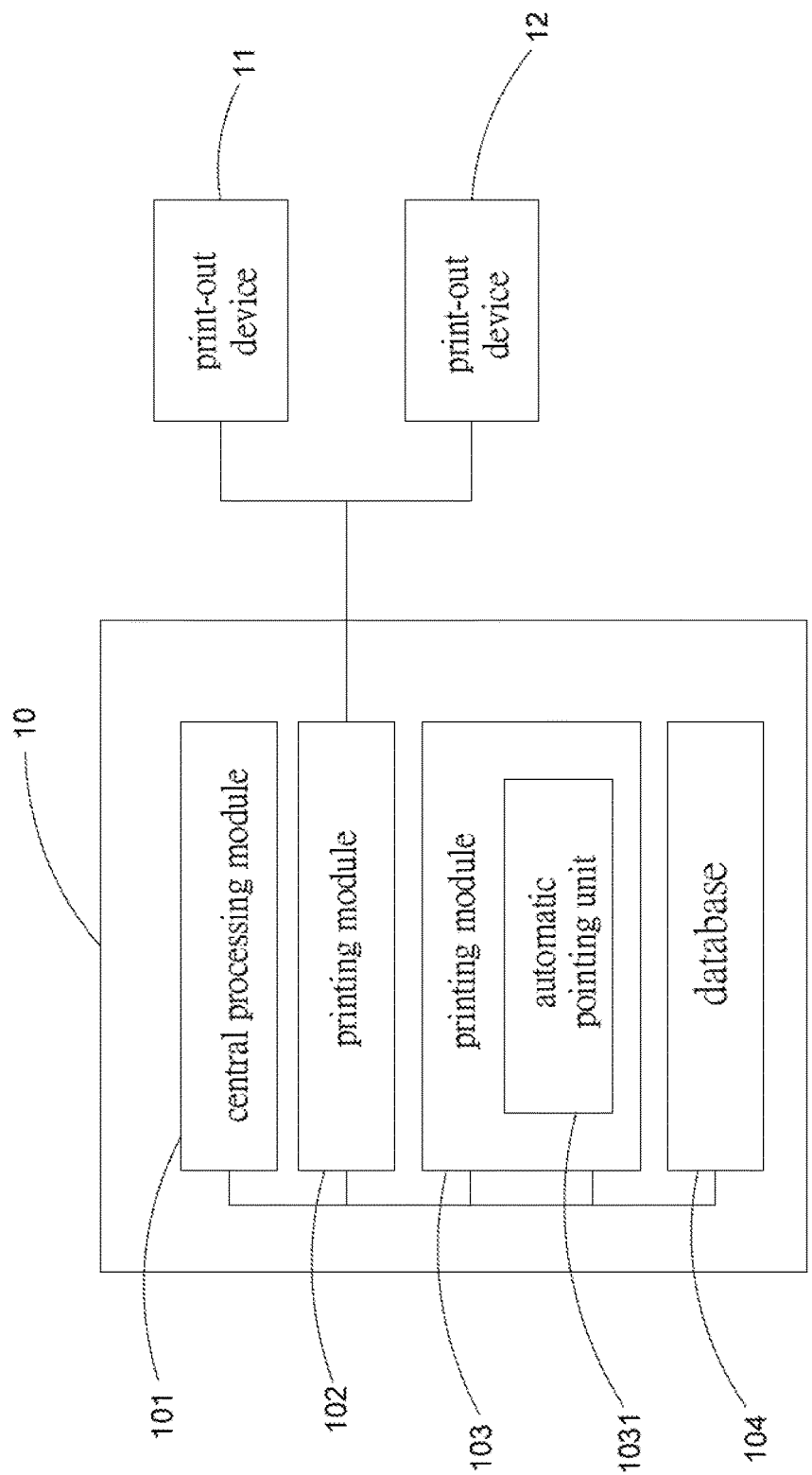
FIG. 10 is still another embodiment (2) of the present disclosure.

As shown in FIG. 10, an automatic pointing unit 1031 can further be disposed in the pointing module 103 of the present disclosure for allowing to input a pointing rule in advance automatically or by user. The pointing rule is the information for changing the print path.

When one of the workstations is out of order and fails to print out document, the system can automatically changes the print path through the pointing rules stored in the automatic pointing unit 1031. For example, user can set in the pointing rules that, upon failure of the print-out device of one of the workstations, the print path can be automatically changed to a normal print-out device closest to the failed print-out device, or can be set to be the designated specific print-out device in advance, or to a print-out device currently in idle state so as to perform printing procedure.

Figure 11:
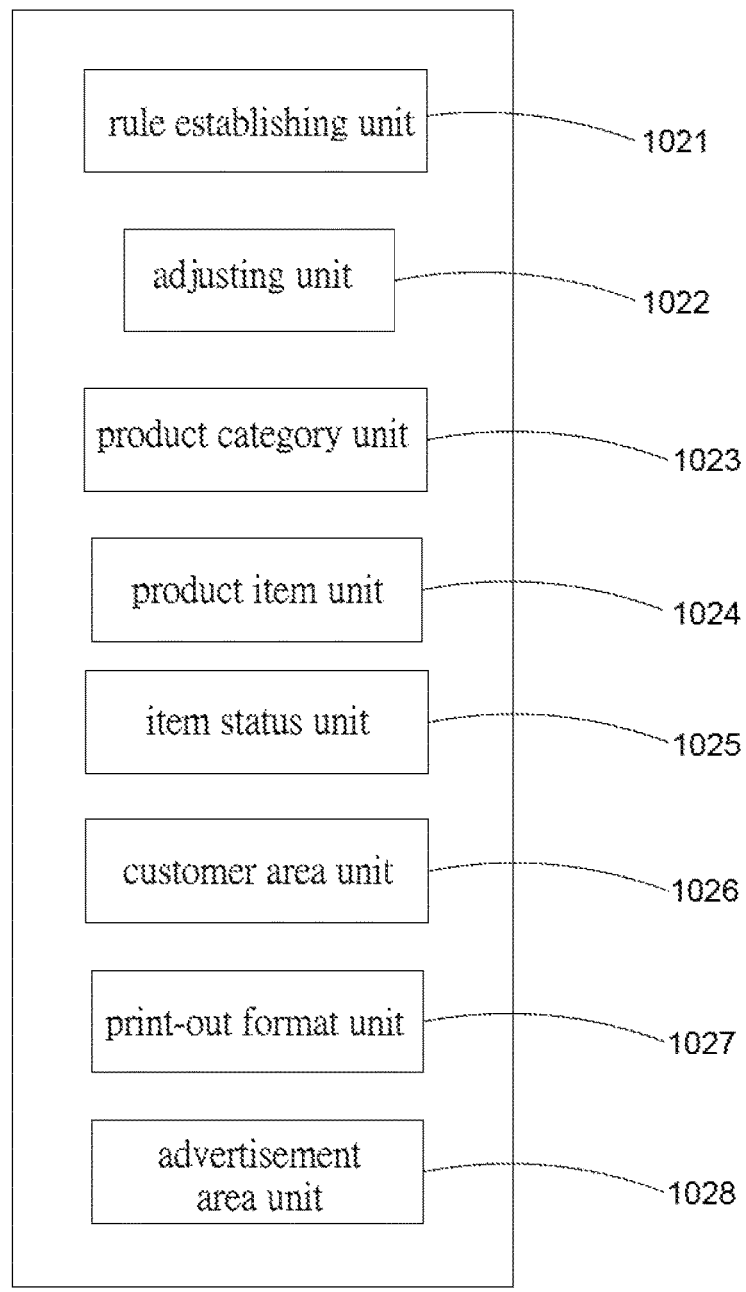
FIG. 11 is yet another embodiment (2) of the present disclosure.

As shown in FIG. 11, the present disclosure as described above may further include an advertisement area unit 1028 in the printing module 102, which can display an advertisement area on the printed sheet for displaying, for example, an introduction of meals, an offer, or membership related information.

Figure 12:
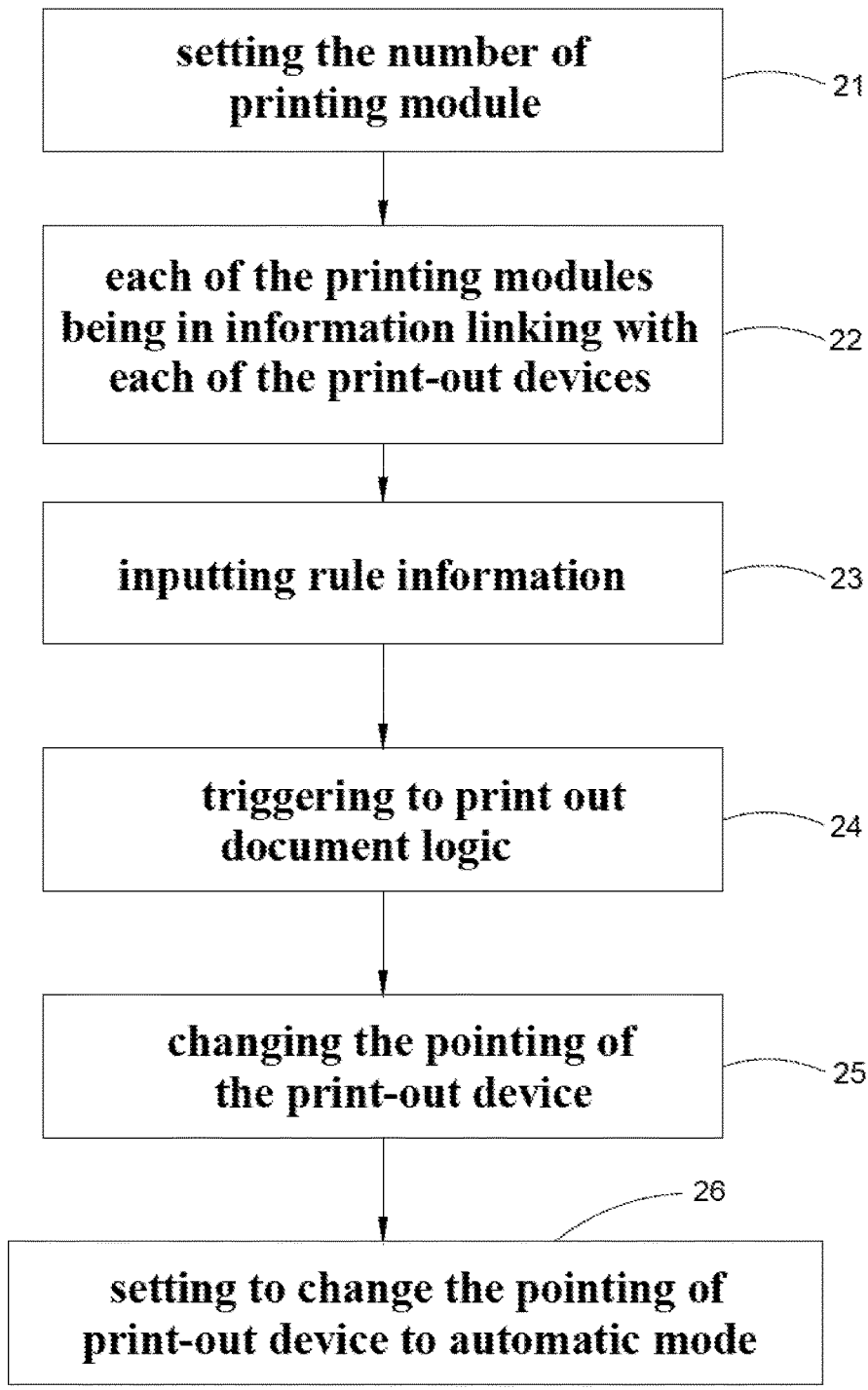
FIG. 12 is a view showing the steps of implementation flow chart of the present disclosure.

Referring to FIG. 12 and also to FIGS. 2-9, the implementation steps of the present disclosure will be described as below.

(1) setting the number of printing module step 21: according to demand, setting the number of printing module 102 in advance in the virtual print-out system 10 automatically or by user;

(2) each of the printing modules being in information linking with each of the print-out devices step 22: After finishing the step of setting of the number of the printing module 102, further allowing each of the printing modules 102 to be in information linking with each of the print-out devices of each workstation according to the demand;

(3) inputting rule information step 23: inputting rule information through the rule establishing unit 1021 of the printing module 102 and saving the rule information in the database 104 through the central processing module 1021. If there are multiple printing modules 102 present in the system, user can input different rule information may be inputted separately through the rule establishing unit 1021 of each of the printing modules 102;

(4) triggering to print out document logic step 24: When restaurant service staff makes meal order for a customer, if the customer's meal triggers the condition of the print-out logic, the printing module 102 can drive corresponding print-out device (11, 12) to perform printing procedure;

(5) changing the pointing of the print-out device step 25: When one of the print-out devices (11,12) linked with the printing module 102 is out of order, the print path of the failed print-out device can be changed to another normal print-out device through the pointing module 103 automatically or by the user;

(6) setting to change the pointing of print-out device to automatic mode step 26: a pointing rule is inputted automatically or by the user through the automatic pointing unit 1031 in such a manner that the pointing module 103 can further perform automatically to change print path according to the pointing rule.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

The invention claimed is:

1. An implementation method of virtual print-out system, comprising:

(1) setting the number of printing module step: setting the number of printing module according to at least one demand in advance in the virtual print-out system;

(2) each of the printing modules being in information linking with each of the print-out devices step: allowing each of said printing modules to be in information linking with each of the print-out devices of each workstation;

(3) inputting rule information step: inputting more than one piece of rule information through the rule establishing unit of said printing module and saving said one piece of rule information in a database through a central processing module;

(4) triggering to print out document logic step: when trigger condition of said one piece of rule information is satisfied, said printing module drives corresponding said print-out device to perform printing procedure; and (5) changing the pointing of the print-out device step: when printing is disabled in said "triggering to print out document logic step", said "changing the pointing of the print-out device step" is performed so that said print path is changed to a normal said print-out device;

wherein said printing module, in said triggering to print out document logic step, transmits print-out information to said print-out device that is to be conducted with printing, said print-out device after receiving said print-out information will send status report information to said printing module; if said print module has not received said status report information over a period of time, it indicates that said print-out device may have trouble, then said "changing the pointing of the print-out device step" is performed so that the print path of said failed print-out device is changed to another normal said print-out device; and wherein a "setting to change the pointing of print-out device to automatic mode step" is further performed in said "changing the pointing of the print-out device step", when said "setting to change the pointing of print-out device to automatic mode step" is executed, an automatic pointing unit in said pointing module is inputted with a pointing rule, whereby said pointing module can further perform automatically the operation of changing print path according to said pointing rule.

2. The method of claim 1, wherein said pointing rule is one rule selected from the following or an assembly containing the following: said print path is automatically changed to a normal print-out device closest to the failed print-out device, or is set to be the designated specific print-out device in advance, or is changed to a print-out device currently in idle state to perform printing procedure.

* * * * *